US005915489A

United States Patent [19]

Yamaguchi

[11] Patent Number: 5,915,489

[45] Date of Patent: Jun. 29, 1999

[54] HYBRID VEHICLE

[75] Inventor: Kozo Yamaguchi, Aichi-ken, Japan

[73] Assignee: Kabushikikaisha Equos Research, Japan

[21] Appl. No.: 08/636,701

[22] Filed: Apr. 23, 1996

[30] Foreign Application Priority Data

Apr. 28, 1995 [JP] Japan .................................... 7-129839

[51] Int. Cl.[6] ........................................ B60K 6/02

[52] U.S. Cl. ........................................ 180/65.2

[58] Field of Search .................................. 180/65.2, 65.3, 180/65.4, 65.6, 65.8; 310/102 R, 121, 123

[56] References Cited

U.S. PATENT DOCUMENTS 3,192,421 6/1965 Sayler ................................ 310/102 R
3,488,533 1/1970 Pope ........................................ 310/123
3,566,717 3/1971 Berman et al. ........................ 180/65.2
3,623,568 11/1971 Mori ........................................ 180/65.2
4,024,926 5/1977 Butoi ........................................ 180/65.3
4,335,429 6/1982 Kawakatsu ............................. 180/65.2
5,635,805 6/1997 Ibaraki et al. ......................... 180/65.4
5,713,425 2/1998 Buschhaus et al. ................... 180/65.2

*Primary Examiner*—J. J. Swann
*Assistant Examiner*—Frank Vanaman
*Attorney, Agent, or Firm*—Lorusso & Loud

[57] ABSTRACT

A hybrid vehicle capable of ensuring rotation of an engine output shaft at any time, regardless of whether an engine is in a driving condition or a non-driving condition. The engine 11 capable of switching between the driving condition and the non-driving condition, a generator 16, and counter-shaft 31 are mutually connected through a planetary gear unit 13, in which rotation of the generator 16 is controlled when a vehicle control device 41 selects the non-driving condition, thereby the engine output shaft 12 in the non-driving condition is rotated at any time, with the result that the driving of auxiliary machinery, which obtains rotation from the engine output shaft 12, is ensured.

23 Claims, 9 Drawing Sheets

9 11 16 22 23 13 P R 14 15 12 21 G EG S CR 17 38 32 33 31 39 37 M 26 27 36 25 35

25 66 38 9 11 39 72 75 14 12 37 M G EG 71 73 33 31 32 36 35

EG
11
9
12
13
14
15
P
R
S
CR
17
16
G
21
22
23
31
32
33
35
36
26
27
M
25
37
38
39

HYBRID VEHICLE

BACKGROUND OF THE INVENTION

1. Field of the Invention

This invention relates to a hybrid vehicle and, more particularly, to a hybrid vehicle driven by a motor and an engine as a driving force.

2. Description of the Related Art

Conventionally, hybrid vehicles having a driving system using both an engine and a motor have been provided.

Various types of hybrid vehicles have been proposed, for example, the hybrid vehicle of the series type in which electric power, generated by a generator driven by driving the engine, is converted to a direct current to charge a battery, and electric power from the battery is converted to alternating current to drive a driving motor. Another hybrid vehicle is the parallel type in which the vehicle is driven to simultaneously or selectively transmit driving force produced by the engine and the driving motor to an output shaft and is accelerated or decelerated by controlling mainly the output of the driving motor.

In the aforementioned hybrid vehicle, the engine is usually operated in a state of optimum efficiency regardless of the driving speed. Generally, the state of optimum efficiency of the engine is in a high-load area, so that, in the hybrid vehicle, the engine is usually driven in a high-load area.

For instance, in the case of the hybrid vehicle of the parallel type, when the driving force of the engine is greater than the necessary driving force for driving, the motor is used as the generator to be able to charge the battery with redundantly generated energy as regenerative electric power. Further, in the hybrid vehicle which is braking, the motor is used as the generator to charge the battery with regenerative electric power transferred from energy produced by decelerating the vehicle.

Further, when the brake is applied while the engine is driven, energy generated by the engine is required to be convertedto regenerative electric power, however, the battery has a limitation for the level of charge and, therefore, in some cases, neither regenerative electric power caused by engine energy nor regenerative electric power caused by energy produced by decelerating can be charged to the battery.

In order to increase energy efficiency yet reduce generation of redundant regenerative electric power, the engine may be cut out while regenerative electric power is generated when braking. However, there is a disadvantage in that auxiliary machinery supplied with driving force from the engine cannot be driven when the engine is stopped. Thus another disadvantage also occurs when the vehicle is driven by using only the driving motor.

In the hybrid vehicle of the series type, the engine is required to be cut out when not supplied from the generator with electric power in excess of the level of charge of the battery when sufficient charge can be obtained, therefore the auxiliary machinery cannot also be driven.

It is an object of the present invention to provide the hybrid vehicle capable of retaining engine speed to exceed a specified value at all times even when being driven with the engine cut-out.

SUMMARY OF THE INVENTION

In order to attain the aforementioned objective, the present invention provides a hybrid vehicle including: an internal-combustion engine; a generator/motor from which rotational speed or torque is controlled; a driving motor; a driving output shaft connected to the internal-combustion engine and the motor; a selection means for selecting a driving condition or a non-driving condition for the internal combustion engine; and a generator control means for controlling the rotational speed or torque of the generator/motor, in which the generator control means controls the rotational speed or torque of the generator/motor in order to cause the rotational speed of an output shaft of the internal-combustion engine to maintain a specified value when the selection means selects the non-driving condition.

The hybrid vehicle according to the present invention further includes a differential gear unit including at least three gear elements which are a first gear element connected to the generator, a second gear element connected to the output shaft, and a third gear element connected to the internal-combustion engine.

The hybrid vehicle of the present invention further includes auxiliary machinery driven by receiving rotation from the output shaft of the internal-combustion engine, the engine speed required for delivering the function of the auxiliary machinery being the value previously specified for the rotational speed of the output shaft of the engine. The auxiliary machinery may be an oil pump.

The generator control means controls the rotational speed of the generator/motor in response to the driving load of the auxiliary machinery. The generator control means causes the rotational speed of the output shaft of the internal-combustion engine to increase in accordance with the vehicle speed when the vehicle speed is higher than a specified value. But when the vehicle speed is lower than a specified value, the generator control means causes the generator/motor to drive as a motor.

The selection means selects non-driving condition when the vehicle braking is detected.

Further, the hybrid vehicle may be structured to include: an internal-combustion engine; a generator from which rotational speed is controlled; a driving motor; a driving output shaft connected to the motor; a selection means for selecting a driving condition or a non-driving condition for the internal-combustion engine; and a generator control means for controlling the rotational speed of the generator, in which the generator control means controls the rotational speed of the generator in order to cause the rotational speed of an output shaft of the internal-combustion engine to maintain a specified value when the selection means selects the non-driving condition.

And further, the hybrid vehicle may be structured to include: an internal-combustion engine; a driving motor; a driving output shaft connected to the motor; a generator, from which rotational speed is controlled, having a stator connected to an output shaft of the internal-combustion engine and a rotor connected to the driving output shaft; a selection means for selecting a driving condition or a non-driving condition for the internal combustion engine; and a generator control means for controlling the rotational speed of the generator, in which the generator control means controls the rotational speed of the generator in order to cause the rotational speed of an output shaft of the internal-combustion engine to maintain a specified value when the selection means selects the non-driving condition.

It is possible for the hybrid vehicle to be structured to include: an internal-combustion engine; a generator controlled with the rotational speed and connected to the internal-combustion engine; a driving motor; a driving output shaft connected to the internal-combustion engine and the motor; and a generator control means for controlling the rotational speed of the generator, in which the generator control means controls the rotational speed of the generator in order to cause the rotational speed of an output shaft of the internal-combustion engine to maintain a specified value when the driving motor alone powers the vehicle.

Consequently, when the selection means selects the non-driving condition, the rotational speed of the output shaft of the engine is defined based on the rotational speeds of a generator and a driving output shaft outputting driving force for the driving wheels. The rotational speed of the driving output shaft is defined in accordance with the vehicle speed, so that the rotational speed of the output shaft of the engine is controlled through the differential gear unit by controlling the rotational speed of the generator.

It is required to rotate the output shaft of the engine at higher than the specified rotational speed at all times in order to operate the auxiliary machinery driven by receiving rotation from the output shaft of the engine.

In other words, by controlling the rotational speed of the generator, the output shaft of the engine is maintained at the rotational speed being necessary for driving the auxiliary machinery.

Further, during high-speed running, the rotational speed of the driving output shaft is higher, so that the rotational speed of the generator exceeds the maximum permissible rotational speed when the rotational speed of the output shaft of the engine is lower. Therefore, the rotational speed of the generator is controlled to be lower than the maximum permissible rotational speed.

In the case of the hybrid vehicle of the series type, when the level of charge of the battery is sufficient, the engine can be in the non-driving condition. At this time, the generator is driven as a motor to ensure rotation of the output shaft of the engine, with the result that the driving of the auxiliary machinery can be maintained.

Further, in response to the operating state of the auxiliary machinery, the rotational speed of the output shaft of the engine in the non-driving condition can be controlled. For example, when load is added to the auxiliary machinery, the rotational speed of the output shaft of the engine is increased.

According to the present invention, in the hybrid vehicle as described above, the engine speed can be retained to exceed the specified value at all times even when the engine is cut off, resulting in operation of the auxiliary machinery at all times.

BRIEF DESCRIPTION OF THE DRAWINGS

FIG. 3 (B) is a velocity line diagram during normal running in the first embodiment according to the present invention;

FIG. 4 (B) is a velocity line diagram when an engine is in a non-driving condition in the first embodiment according to the present invention;

FIG. 5 (B) is a torque line diagram when the engine is in the non-driving condition in the first embodiment according to the present invention;

FIG. 6 (B) is a velocity line diagram of a halting state when the engine is in the non-driving condition in the first embodiment according to the present invention;

DETAILED DESCRIPTION OF THE PREFERRED EMBODIMENT(S)

Figure 1:
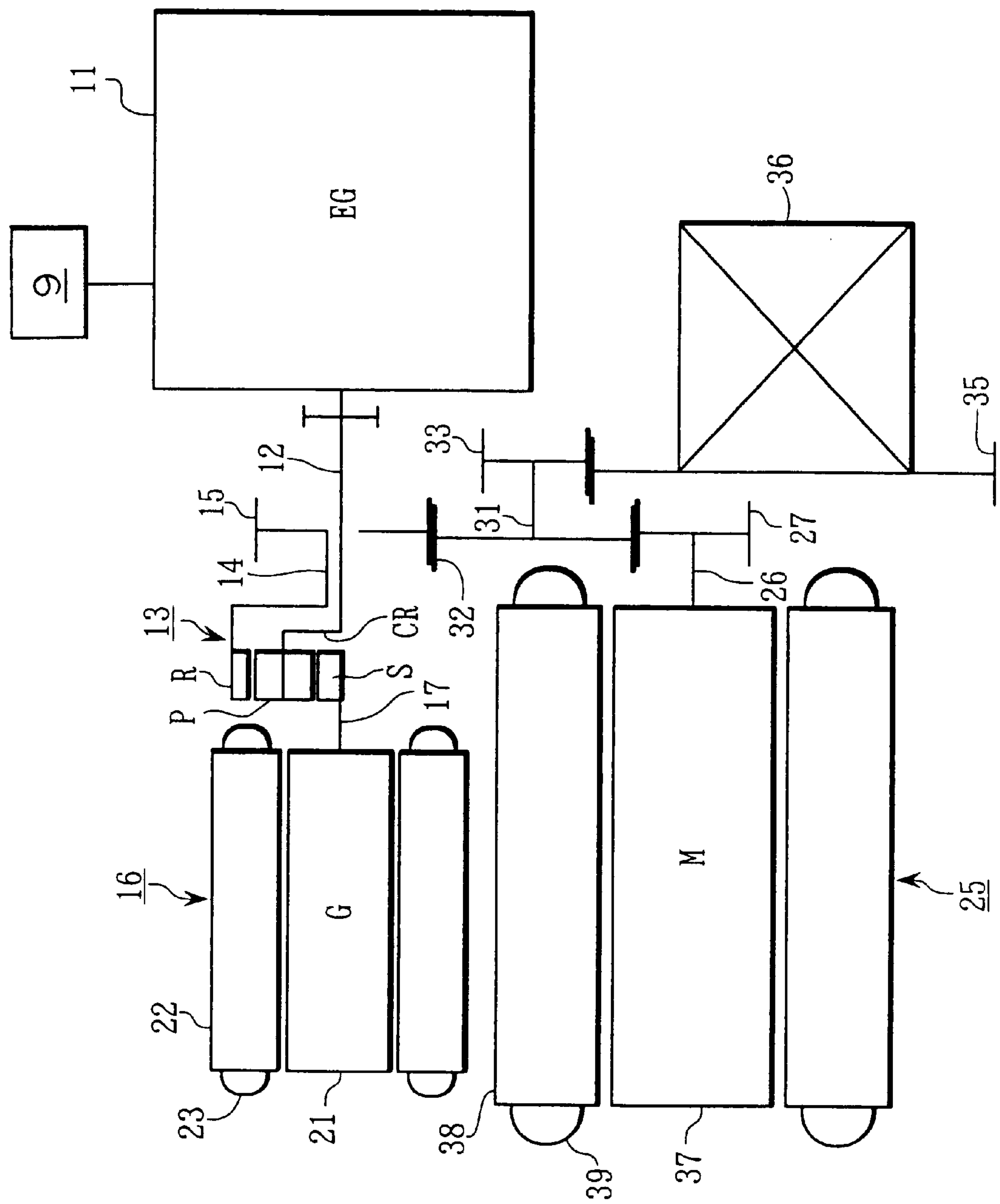
FIG. 1 is a schematic diagram showing an example for a design of a driving system of a hybrid vehicle in a first embodiment according to the present invention.

Certain terminology will be used in the following description for convenience in reference only and will not be limiting. The words “up”, “down”, “right” and “left” will designate directions in the drawings to which reference is made. The words “in” and “out” will refer to directions toward and away from, respectively, the geometric center of the device and designated parts thereof. Such terminology will include derivatives and words of similar import.

The preferred embodiments of the present invention will be explained in detail with reference to the attached drawings. FIG. 1 shows a schematic diagram of a drive train in a hybrid vehicle of a first embodiment according to the present invention. In the drawing, on the “first shaft”, an engine 11, an oil pump 9, an engine output shaft 12 for outputting rotation generated by driving the engine 11, a planetary gear unit 13 as a differential gear unit which changes the speed of the rotation inputted through the engine output shaft 12, unit output shaft 14 for outputting the rotational speed changed by the planetary gear unit 13, a first counter drive gear 15 fixed to the unit output shaft 14, a generator/motor 16 principally operating as a generator in a normal running condition, and a transmission shaft 17 connecting the generator/motor 16 and the planetary gear unit 13, are provided. The unit output shaft 14 has a sleeve-shape and is provided to encircle the engine output shaft 12. The first counter drive gear 15 is provided closer to the engine than the planetary gear unit 13.

The planetary gear unit 13 includes a sun gear S as the first gear element, a pinion P meshing with the sun gear S, a ring gear R meshing with the pinion P as the second gear element, and a carrier CR rotatably supporting the pinion P as the third gear element.

The sun gear S is connected to the generator/motor 16 by the transmission shaft 17, the ring gear R is connected to the first counter drive gear 15 by the unit output shaft 14, and the carrier CR is connected to the engine 11 by the engine output shaft 12.

The generator/motor 16 is fixed to the transmission shaft 17, and includes a rotatably provided rotor 21, a motor stator 22 arranged around the rotor 21, and a coil 23 wound around the stator 22. The generator/motor 16 generates electric power by rotation transmitted through the transmission shaft 17. The coil 23 is connected to a battery (not-shown) so as to supply electric power to charge the battery.

On the "second shaft" parallel to the "first shaft", a driving motor 25, a motor output shaft 26 outputting rotation of the driving motor 25, and a second counter drive gear 27 fixed to the motor output shaft 26, are included.

The driving motor 25 is fixed to the motor output shaft 26, and includes a rotatably provided rotor 37, a motor stator 38 arranged around the rotor 37, and a coil 39 wound around the motor stator 38. The driving motor 25 generates torque by electric current fed to the coil 39. Consequently, the coil 39 is designed to be connected to the battery (not-shown) so as to be fed electric current from the battery.

In a decelerating condition of the hybrid vehicle according to the present invention, the driving motor 25 generates regenerative electric power by receiving rotation caused by the driving wheels (not-shown).

In order to rotate the driving wheels (not-shown) in the same direction as the rotation of the engine 11, on the "third shaft" parallel to the "first shaft" and the "second shaft", a counter-shaft 31 as a driving output shaft is provided. A counter driven gear 32 is fixed to the counter-shaft 31.

By meshing the counter driven gear 32 and the first counter drive gear 15, and further meshing the counter driven gear 32 and the second counter drive gear 27, the rotation of the first counter drive gear 15 and the rotation of the second drive gear 27 are transmitted to the counter driven gear 32 to rotate in a reverse direction.

Further, a dif-pinion gear 33 having a smaller number of gear teeth than the counter driven gear 32 is fixed to the counter-shaft 31.

On the "fourth shaft" parallel to the "first shaft", the "second shaft" and the "third shaft", a dif-ring gear 35 is provided to mesh with the dif-pinion gear 33. A differential gear unit 36 is fixed to the dif-ring gear 35, in which the rotation, transmitted to the dif-ring gear 35, is shifted by the differential gear unit 36 in order to be transmitted to the driving wheels.

The rotation produced by the engine 11 can be transmitted to the counter driven gear 32, furthermore, the rotation produced by the driving motor 25 can be transmitted to the counter driven gear 32, whereby the hybrid vehicle can be driven in an engine driving mode in which only the engine is driven, a motor driving mode in which only the motor is driven, and an engine-motor driving mode in which both engine and motor are driven. Further, as will be set forth below, by controlling electric power generated by the generator 16, the rotational speed of the transmission shaft 17 can be controlled. And also, the engine 11 can be started by the generator 16.

For the differential gear unit, a unit using a bevel gear may be used. Here, as auxiliary machinery driven by receiving the rotation transmitted from the engine output shaft 12 connected to the engine 11, a hydraulic pump composed of a gear pump, a vacuum servo structure in a brake system, a compressor for an air conditioner and power steering are listed as examples.

Figure 2:
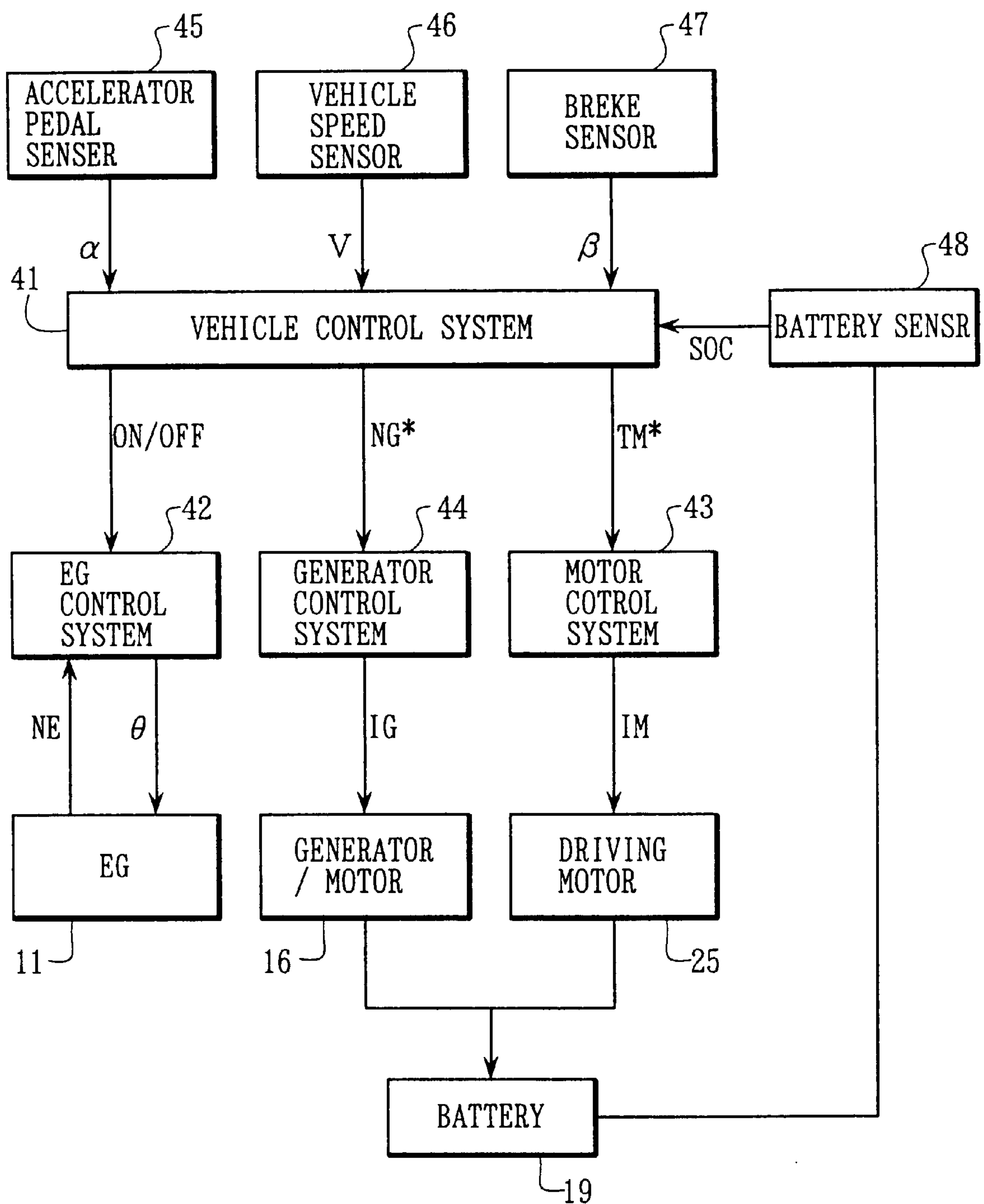
FIG. 2 is a block diagram showing a design of a control system of the hybrid vehicle in the first embodiment according to the present invention.

Next, a control system of the hybrid vehicle of the present invention will be explained with reference to a block diagram shown in FIG. 2. A control means composing of the control system according to the present invention has a vehicle control system 41, an engine control system 42, a motor control system 43 and a generator control system 44. The vehicle control system 41 can be designed with a micro computer including, for example, CPU (Central Processing Unit), ROM (Read-Only Memory) storing various programs and data, and RAM (Random-Access Memory) used as a working area.

Further, the control system includes an accelerator pedal sensor 45 for detecting the degree of accelerator opening α, a vehicle speed sensor 46 for detecting the vehicle speed V, a brake sensor 47 for detecting a braking rate β, and a battery sensor 48 for detecting the value of the storage capacity SOC of the battery 19. Each value detected in the sensors 45, 46, 47, and 48 is sent to the vehicle control device 41.

The vehicle system 41 is used to control the whole hybrid vehicle, and determines torque TM* based on the degree of accelerator opening α received from the accelerator pedal sensor 45 and the vehicle speed V received from the vehicle speed sensor 46 to supply to the motor control system 41.

The vehicle system 41 supplies an engine ON/OFF signal to the engine control system 42. More specifically, by applying pressure on the brake, the braking rate β is supplied from the brake sensor 47, and whereupon the vehicle system 41 supplies the engine OFF signal to switch the engine 11 into a non-driving condition, and the brake is released, whereupon the vehicle system 41 supplies the engine ON signal to switch the engine 11 into a driving condition.

Further, the vehicle system 41 supplies a target rotational speed NG* of the generator/motor 16 based on the vehicle speed V sent from the vehicle speed sensor 46 and the braking rate β received from the brake sensor 47 to the generator control device 44 in order that an engine speed NE of the engine in the OFF state is to be an engine speed NEmin which is necessary for driving auxiliary machinery.

The engine control system 42 switches the engine 11 into the driving condition (ON state) outputting an engine torque, and into the non-driving condition (OFF state) not generating the engine torque in response to selection instruction signal inputted from the vehicle control device 41, and further, the engine control system 42 controls the output of the engine 11 by controlling the degree that the throttle of the engine 11 is opened θ in response to the engine speed NE inputted from an engine speed sensor 48.

The motor control system 43 controls electric current (torque) IM of the driving motor 25 in order that the supplied torque TM* is outputted from the driving motor 25.

The generator control system 44 controls, by controlling the rotational speed NG of the generator/motor 16, electric current (torque) IG when the engine is in an OFF state so as to be the target rotational speed NG*.

Figure 3A:
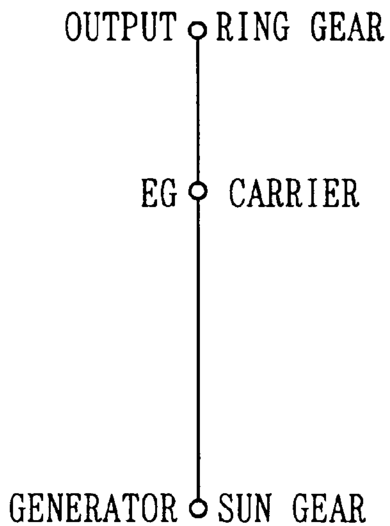
FIG. 3 (A) is a line diagram of a planetary gear unit in the first embodiment according to the present invention.
Figure 3B:
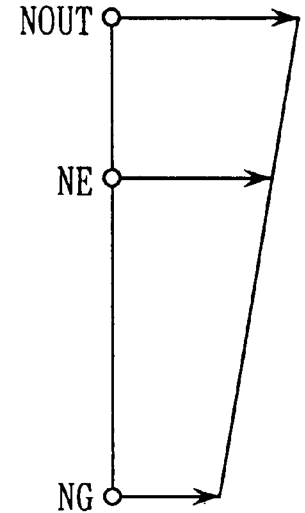

Operation of the hybrid vehicle structured as above will be explained below. FIG. 3 (A) shows a conceptual diagram of the planetary gear unit 13 (FIG. 1) of the first embodiment according to the present invention, FIG. 3 (B) shows a velocity diagram of the planetary gear unit 13 of the first embodiment of the present invention during normal running, and FIG. 4 (A) is a torque diagram of the planetary gear unit 13 of the first embodiment of the present invention during normal running.

In the embodiment, as is shown in FIG. 3 (A), the ring gear R in the planetary gear unit 13 has twice the number of gear teeth of the sun gear S. Therefore, when the rotational speed of the unit output shaft 14 (an output rotational speed) connected to the ring gear R is defined as NOUT, and the rotational speed of the engine output shaft 12 (an engine speed) connected to the carrier CR is defined as NE, and the rotational speed of the transmission shaft 17 (a generator/motor rotational speed) connected to the sun gear S is defined as NG, as shown in FIG. 3 (B), then the relationship among NOUT, NE, and NG is to be the following:

$$NG=3\cdot NE-2\cdot NOUT.$$

Figure 4A:
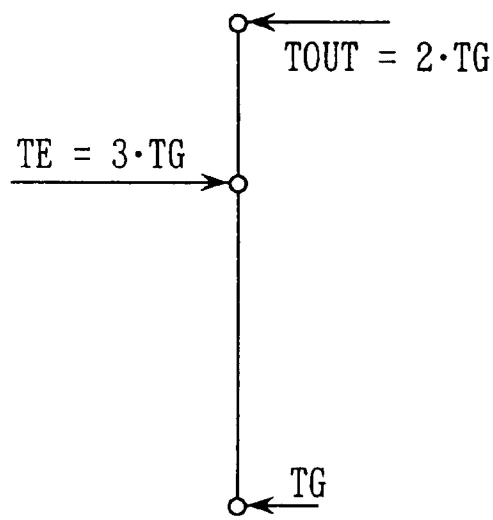
FIG. 4 (A) is a torque line diagram during normal running in the first embodiment according to the present invention.
Figure 4B:
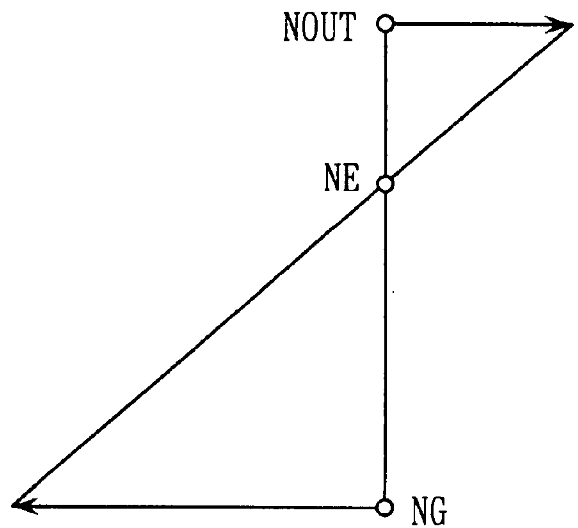

Further, when the output torque of the unit output shaft 14 is defined as TOUT, and torque generated by the engine 11 (engine torque) is defined as TE, and the generator/motor torque is defined as TG, as shown in FIG. 4 (A), then the relationship among TOUT, TE and TG is to be the following:

$$TE:TOUT:TG=3:2:1$$

In a normal running hybrid vehicle, the ring gear R, the carrier CR and the sun gear S are all rotated in the positive direction, and naturally, the output rotational speed NOUT, the engine speed NE, and the generator/motor rotational speed NG all have a positive value.

The engine torque TE is inputted to the carrier CR, and then the input engine torque TE is acquired by the reaction caused by the rotations of the first counter drive gear 15 and the generator/motor 16 which are shown in FIG. 1. As a result, the output torque TOUT is outputted from the ring gear R to the unit output shaft 14, and the generator/motor torque TG is outputted from the sun gear S to the transmission shaft 17 as shown in FIG. 4 (A).

The aforementioned output torque TOUT and the generator/motor torque TG are obtained by proportionally allotting the engine torque TE with a torque ration which is defined by the number of gear teeth of the planetary gear unit 13, that is, on the torque diagram, the total of the output torque TOUT and the generator/motor torque TG results in the engine torque TE.

The following is an explanation as to the operation of the hybrid vehicle when the engine 11 is in the non-driving condition and the generator/motor 16 is not controlled during the running of the hybrid vehicle.

FIG. 4 (B) shows a velocity line diagram in the case of the engine 11 in the non-driving condition in the first embodiment of the present invention. While braking during running, the engine 11 is switched to the non-driving condition, and naturally, the engine speed NE is to be zero, thereby the carrier CR is stopped. The ring gear R is rotated in the positive direction by receiving the rotation of the driving wheels, and the carrier CR is stopped, so that the sun gear S is rotated in the negative direction. Consequently, as shown in FIG. 4 (B), the output rotational speed NOUT is to be positive, the engine speed NE is to be zero, and the generator/motor rotational speed NG is to be negative.

Figure 5A:
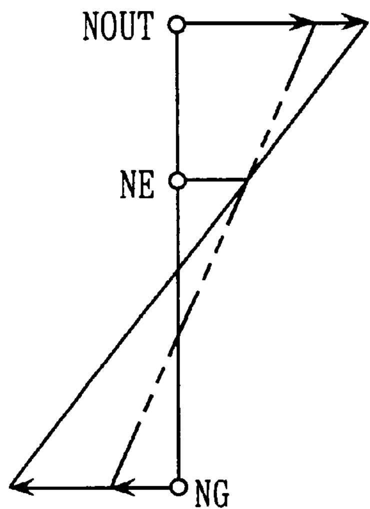
FIG. 5 (A) is a velocity line diagram when the engine is in the non-driving condition in the first embodiment according to the present invention.
Figure 5B:
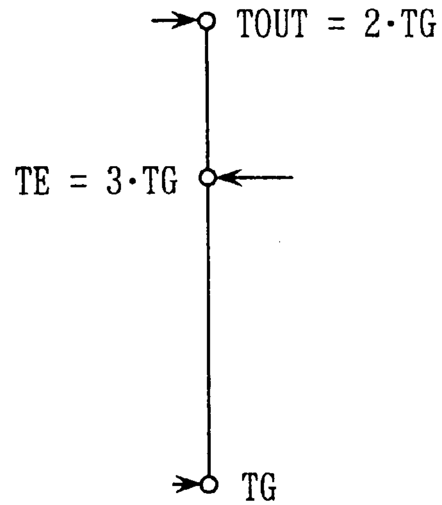

Now, the following is an explanation as to the operation of the hybrid vehicle when the engine 11 is in the non-driving condition but the generator/motor 16 is to generate reaction. FIG. 5 (A) shows a velocity line diagram in the case of the engine 11 in the non-driving condition in the first embodiment of the present invention, and FIG. 5 (B) shows a torque diagram in the case of the engine in the non-driving condition in the first embodiment of the present invention.

In the hybrid vehicle according to the present invention, the generator/motor 16 is controlled to retain the necessary engine speed NEmin of the engine output shaft 12 as with the previously specified value of the rotational speed in order to ensure driving of the auxiliary machinery. More specifically, when the engine 11 is in the non-driving condition, the engine speed NE of the engine is sought from NE=0.67NOUT+0.33NG, and the output rotational speed NOUT of the ring gear R is decided by the rotational speed of the driving wheels, so that the engine speed NE is retained at NEmin by controlling the generator/motor rotational speed NG in response to the output rotational speed NOUT.

As shown in FIG. 5 (A), when the engine 11 is in the non-driving condition, the output rotational speed NOUT is to be positive and the generator/motor rotational speed NG is to be negative, but the generator/motor rotational speed NG is controlled in order that the engine speed NE is to be NEmin, so that the engine 11 is rotated by the rotational speed of the generator/motor rotational speed NG, with the result that the engine speed NE is to be NEmin.

Decreasing the vehicle speed V by braking, the output rotational speed NOUT is decreased, but, as is known from a dotted line in FIG. 5 (A), the generator/motor rotational speed NG is decreased in response to a decrease of the output rotational speed NOUT, thereby the engine speed NE is controlled to be NEmin at any time.

As shown in FIG. 5 (B), the engine torque TE acts on the planetary gear unit 13 as an engine-brake torque, therefore, torque in the reverse direction of the direction during running acts on each element of the planetary gear unit 13.

Figure 6A:
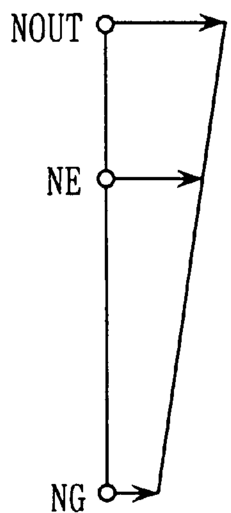
FIG. 6 (A) is a velocity line diagram during running at low-speed when the engine is in the non-driving condition in the first embodiment according to the present invention.
Figure 6B:
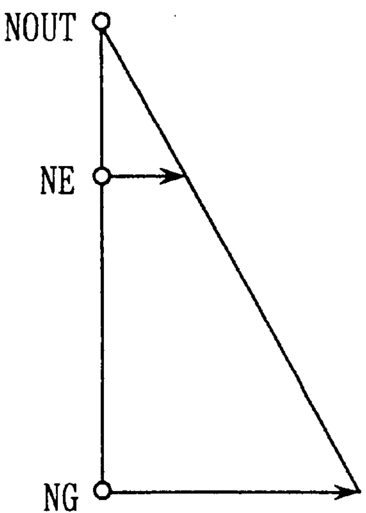

FIG. 6 (A) shows, in the first embodiment of the present invention, a velocity diagram in a low-speed running condition when the engine 11 is in the non-driving condition. Further decreasing the vehicle speed V to the low-speed running condition, the output rotational speed NOUT is also decreased, so that the generator/motor 16 is rotated as a motor in the normal direction (on the right side of FIG. 6 (A)) in order to retain NEmin for the engine speed NE.

FIG. 6 (B) shows, in the first embodiment of the present invention, a velocity diagram in a halting condition when the engine 11 is in the non-driving condition. In this case, the vehicle speed V is zero, so that the output rotational speed NOUT is zero. Under this condition, in order that the engine speed NE is retained at NEmin, the generator/motor 16 is rotated as the motor with rotational speed increasing further in the positive direction (on the right side of FIG. 6 (B)).

Figure 7:
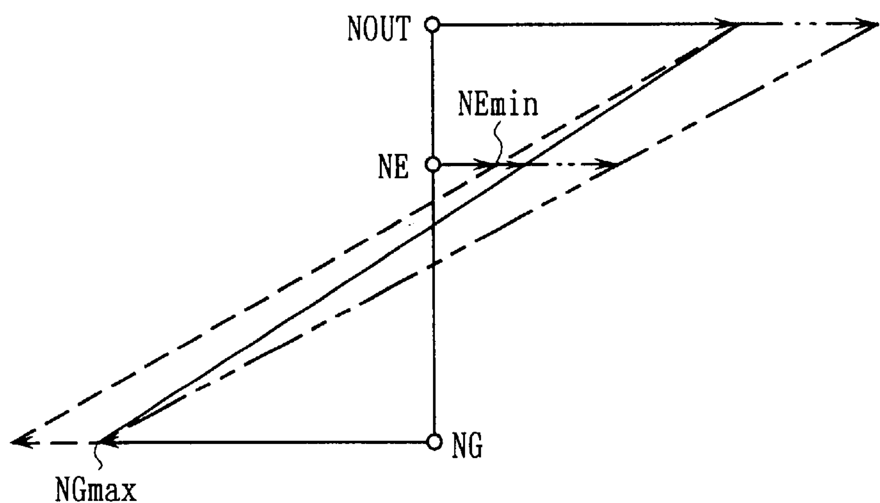
FIG. 7 is a velocity line diagram of a high-speed running condition when the engine is in the non-driving condition in the first embodiment according to the present invention.

FIG. 7 shows, in the first embodiment of the present invention, a velocity line diagram in a high-speed running condition when the engine 11 is in the non-driving condition. When the vehicle speed V is large, the output rotational speed NOUT is increased, therefore, as is known from a dotted line in FIG. 7, if the definition of the engine speed NE remains NEmin, the generator/motor rotational speed NG is excessively increased, resulting in excessiveness of the maximum permissible rotational speed NGmax.

Figure 8:
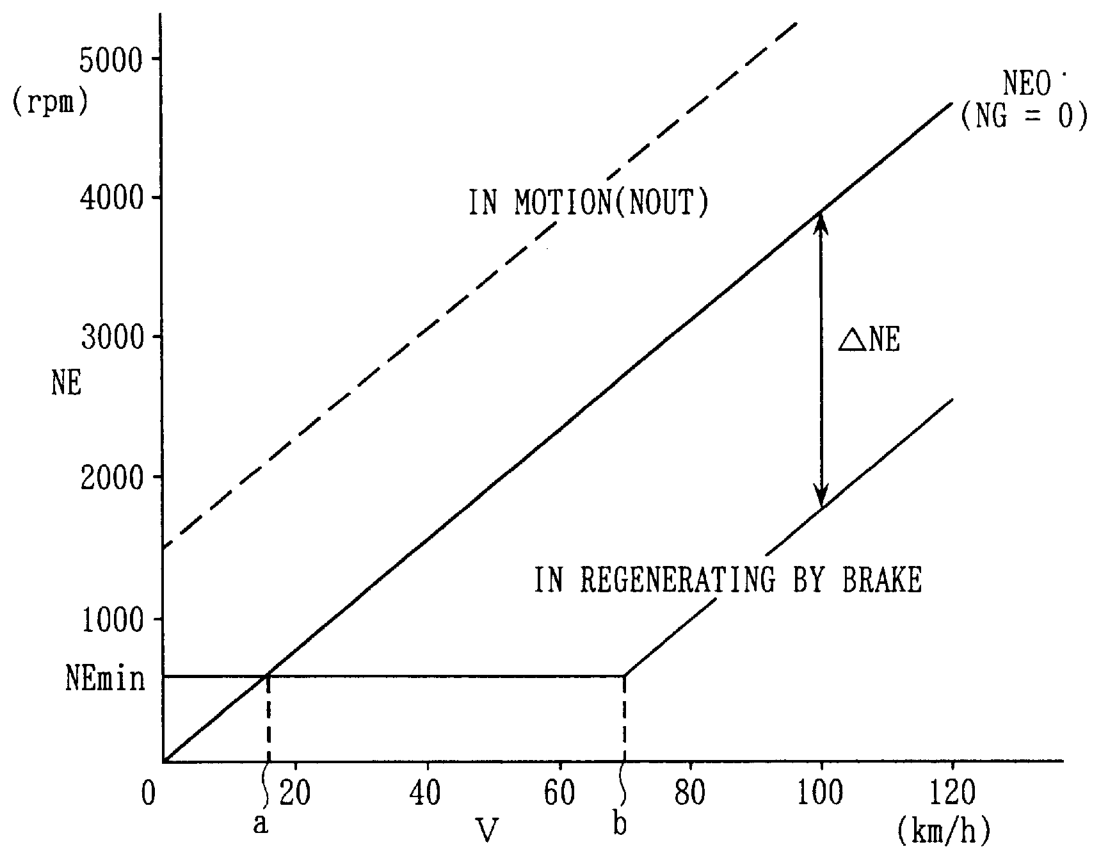
FIG. 8 is a graph showing the relation of vehicle speed V and engine speed NE.

Consequently, during high-speed running, in order to protect the generator/motor 16, the nature of the control is changed as in the following. FIG. 8 is a chart showing the relationship between the vehicle speed V and the engine speed NE. In the case of the engine 11 in the non-driving condition, when the vehicle speed V exceeds a velocity b shown in FIG. 8, the generator/motor rotational speed NG exceeds the maximum permissible rotational speed NGmax, therefore, the engine speed NE is defined as NEO when the generator/motor rotational speed NG is zero to seek the following:

$$NE=NEO-\Delta NE(\Delta NE=NGmax/3)$$

by controlling the generator/motor rotational speed NG. In other words, the generator/motor rotational speed NG is controlled not to exceed the maximum permissible rotational speed NGmax.

Incidentally, a dotted line shown in FIG. 8 shows the engine speed NE in the running condition, in which NE is a value adding three times the generator/motor rotational speed NG to NEO.

Next, a controlling operation of the vehicle control device 41 in a brake application state will be explained with reference to a time chart shown in FIG. 9 and a flow chart shown in FIG. 10.

Figure 9:
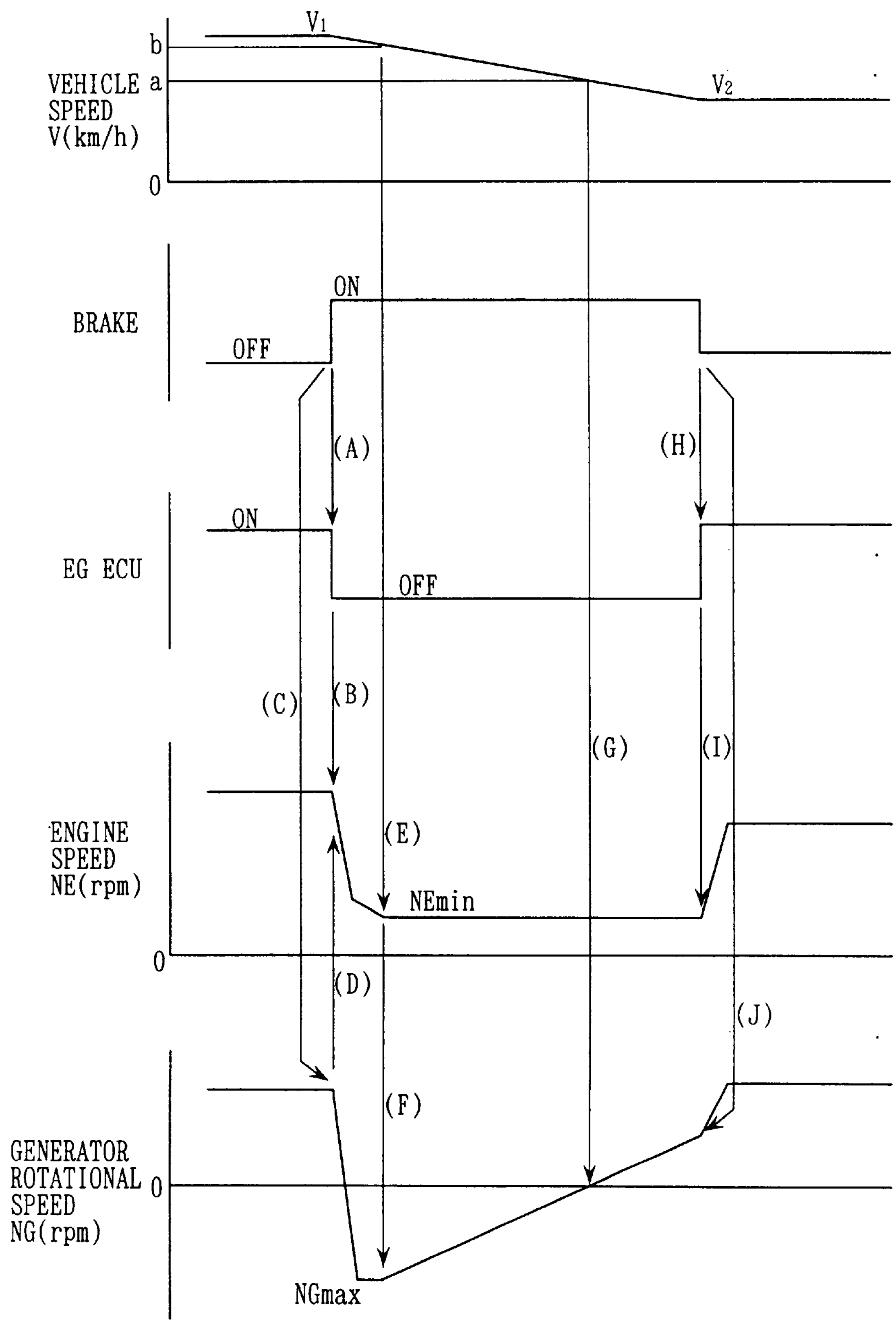
FIG. 9 is a time chart showing a controlling operation by a control system.
Figure 10:
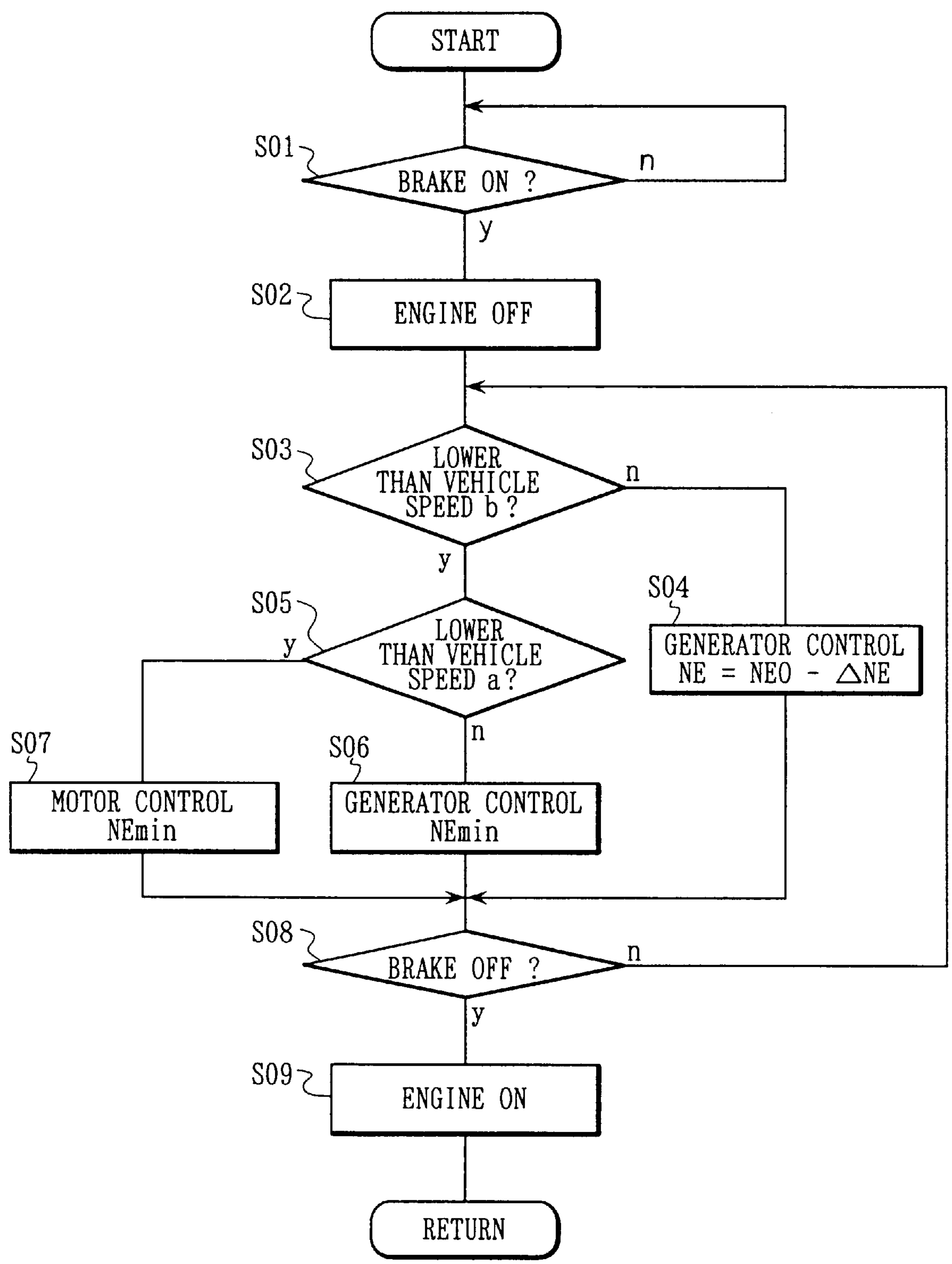
FIG. 10 is a flow chart of the controlling operation by the control system.

The vehicle control device 41 decides the brake is ON by being supplied with a braking rate β from the brake sensor 47 (Step S01), and supplies the engine OFF signal to the engine control device 42 to switch the engine 11 to be in the non-driving condition (Step S02) (the line (A) in FIG. 9). Therefore, the engine speed NE is decreased (the line (B) in FIG. 9).

The vehicle speed V supplied from the vehicle speed sensor 46 is decided whether or not to be lower than the velocity b shown in FIG. 8 (Step S03). The vehicle speed V is higher than the velocity b during high-speed running, so that, the generator/motor 16 is operated as the generator, and the target rotational speed NG* of the generator/motor 16 is decided in order that the engine speed NE is to be (NEO−ΔNE) (the line (D) in FIG. 9) and is supplied to the generator control device 44 (Step S04) (the line (C) in FIG. 9). In this case, electric power regenerated by the generator/motor 16 is charged into the battery 19.

Further, the vehicle speed V is decided whether or not to be lower than the velocity a (Step S05). The vehicle is decelerated by braking and the vehicle speed V becomes lower than the velocity b, and, while the vehicle speed V stays at a position higher than the velocity a, in order that the engine speed NE is to be NEmin (the line (E) in FIG. 9), NG*, in which the generator/motor rotational speed NG is changed in response to the decrease of the vehicle speed V, is supplied (Step S06) (the line (F) in FIG. 9). In this case, electric power regenerated by the generator/motor 16 is also charged into the battery 19.

Still, the vehicle is decelerated, and when the vehicle speed V becomes below the velocity a, the generator/motor 16 is driven as the motor, and the target rotational speed NG* is supplied to retain NEmin of the engine speed NE (Step S07) (the line (G) in FIG. 9).

Next, it is decided whether or not the brake is to be released (Step S08). When the brake application state is continued, the aforementioned Steps S03 to S07 are repeated. When the brake is released, the engine ON signal is supplied to the engine control device 42 to switch the engine 11 into the driving condition (Step S09) (the line (H) in FIG. 9). Consequently, the engine speed NE is returned to an engine speed in the running condition which is in response to the vehicle speed V (the line (I) in FIG. 9), and also, the generator/motor rotational speed NG is returned to a rotational speed running condition (the line (J) in FIG. 9).

In the controlling operation as described thus far, the value of NEmin can be changed based on the condition of the auxiliary machinery. For example, when the air conditioner is being operated or negative pressure on the brake is decreased, the value of NEmin is controlled to be increased.

Incidentally, the present invention can be structured to ensure the driving of the auxiliary machinery by controlling the generator/motor 16 to rotate the engine output shaft 12 even in the case that excludes the brake application state. For example, it is listed as such when a driver selects the running condition by using only the driving motor or when running by using only the driving motor is selected from the view of charging the battery 19 at a higher charged amount than the specified value.

According to the hybrid vehicle of the present invention as described above, even when the auxiliary machinery is not required to be driven, the engine output shaft 12 can be maintained to be rotated at an extremely low rotational speed in the non-driving condition of the engine. By being in the aforementioned state, when the engine 11 is switched to the driving condition after being started in the non-driving condition, shock produced when starting can be avoided.

Lost energy, caused by engine-brake, can be found from the product of the engine torque and the engine speed, however, the lost energy caused by the engine can be controlled to be low by maintaining an extremely low engine speed.

Figure 11:
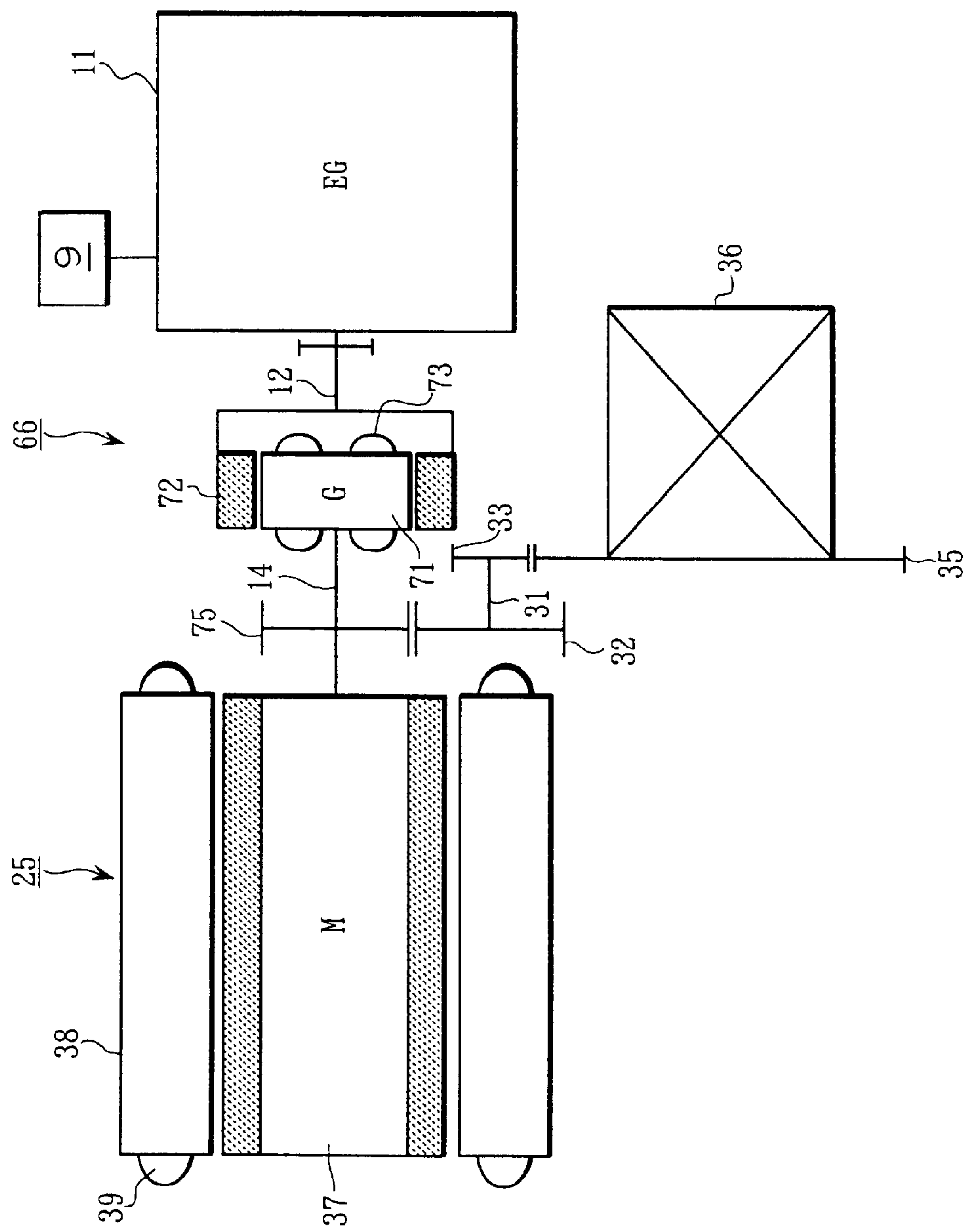
FIG. 11 is a schematic diagram showing an example of a structure of the driving system in a second embodiment according to the present invention.

FIG. 11 shows a conceptual diagram of a drive train in the hybrid vehicle of a second embodiment according to the present invention. As shown in the diagram on the "first shaft", the engine (EG) 11, the oil pump 9, the engine output shaft 12 outputting rotation produced by driving the engine 11, a generator/motor 66 (G) connected to the engine output shaft 12, the output shaft 14 connected to the generator/motor 66, a counter drive gear 75 fixed to the output shaft 14, and the driving motor (M) producing rotation by receiving electric power from the battery 19, are provided.

The generator/motor 66 includes a rotatably produced rotor 71, a magnet stator 72 rotatably provided around the rotor 71, and a coil 73 wound around the rotor 71. The magnet stator 72 fixed with a magnet is not fixed in a case (not shown) and is rotated together with the engine output shaft 12. The rotor 71 is connected to the output shaft 14.

The generator/motor 66 generates electric power by rotation transmitted through the engine output shaft 12. The coil 73 is connected to the battery 19 to supply electric power to charge the battery 19.

The driving motor 25 is fixed to the output shaft 14 and includes the rotatably provided rotor 37, the motor stator 38 arranged around the rotor 37, and the coil 39 wound around the motor stator 38.

The driving motor 25 generates torque by using electric power supplied into the coil 39. Therefore, the coil 39 is connected to the battery 19 to be supplied with electric power from the battery 19. Further, the coil 39 generates regenerative electric power by receiving rotation from the driving wheels, and supplies regenerative electric power to charge the battery. In order to rotate the driving wheels in the same direction as the engine 11 rotates, the counter-shaft 31 is provided on the "second shaft" parallel to the "first shaft", and fixed with the counter driven gear 32. The counter driven gear 32 is meshed with the counter drive gear 75, in which the rotation of the counter drive gear 75 is transmitted to the counter driven gear 32 to reverse the rotation.

Further, the counter-shaft 31 is fixed with the dif-pinion gear 33 having fewer number of gear teeth than the counter driven gear 32. The dif-ring gear 35 is provided on the "third shaft" parallel to the "first shaft" and the "second shaft" to be meshed with the dif-pinion gear 33.

The dif-ring gear 35 is fixed with the differential gear unit 36, in which the differential gear unit 36 transmits the rotation transmitted to the dif-ring gear 35 to the driving wheels to differentially rotate the rotation.

In the embodiment, similarly, when the engine is in the non-driving condition, the rotation of the generator/motor 66 can be controlled in order that the engine speed of the engine output shaft 12 is maintained at NEmin, whereby the driving for the auxiliary machinery can be ensured.

Now, the driving system of the hybrid vehicle of a third embodiment will be explained.

Figure 12:
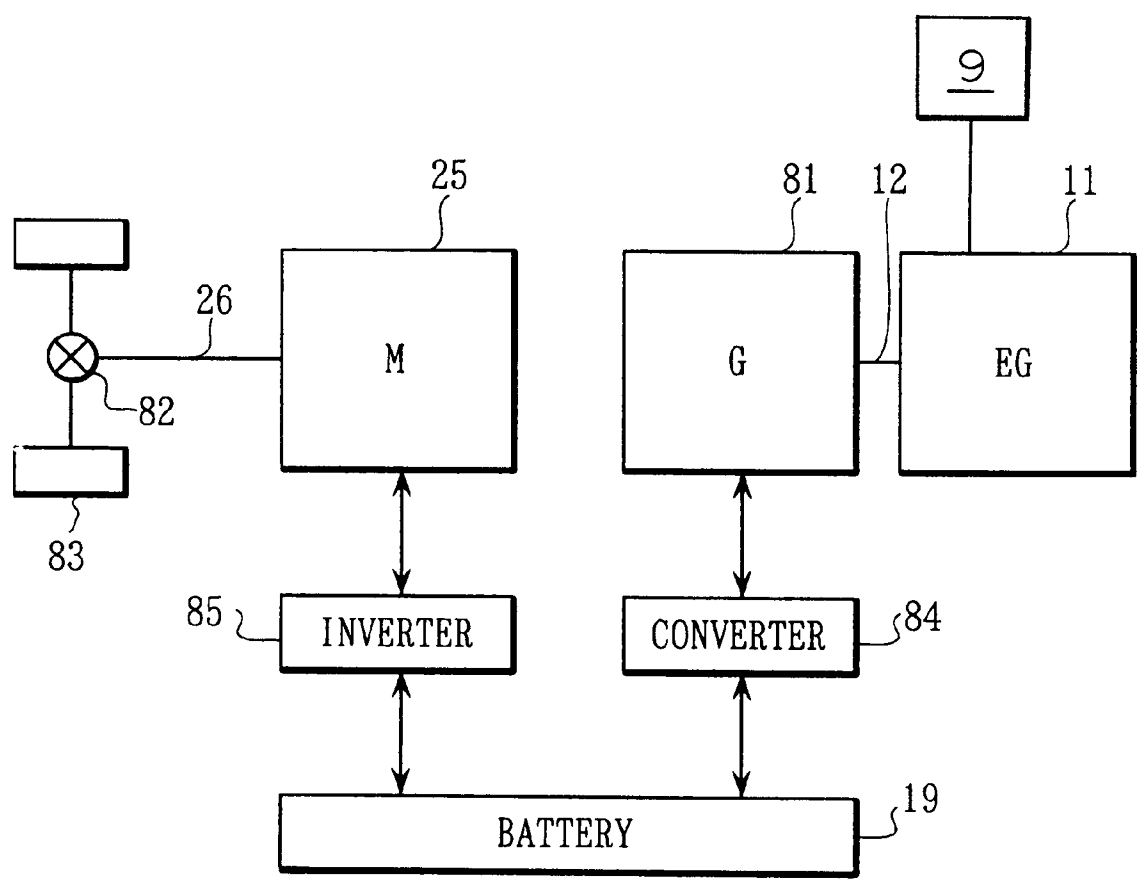
FIG. 12 is a block diagram showing an example of a structure of the driving system of the hybrid vehicle of a series type in a third embodiment.

FIG. 12 shows a conceptual diagram of the driving system of the hybrid vehicle of the series type according to the third embodiment. The driving system includes the engine 11, the oil pump 9, a generator/motor 81 generated by driving force caused by the engine 11, and the driving motor 25, in which a motor output shaft 26 of the driving motor 25 is connected to a differential gear unit 82. It is structured that only the driving force caused by the driving motor 25 is transmitted through the differential gear unit 82 to the driving wheels 83.

Electric power generated by the generator/motor 81 is charged through a converter 84 into the battery 19. Electric power stored in the battery 19 is supplied through an inverter 85 to the driving motor 25 as driving electric power.

The hybrid vehicle of the series type as described above can be driven by cutting out the engine 11 when the charged amount of the battery 19 is sufficient, but in the hybrid vehicle, the engine output shaft 12 can be rotated by driving the generator/motor 81 as a motor when the engine is interrupted, whereby the driving of the auxiliary machinery can be ensured.

Incidentally, the hybrid vehicle according to the present invention is not intended to be limited to the aforementioned structures of the embodiments.

As described thus far, according to the hybrid vehicle of the present invention, even when the engine is in the non-driving condition, the output shaft of the engine is rotated, whereby auxiliary machinery can be operated at any time, regardless of the driving condition of the engine.

The engine speed of the output shaft of the engine is controlled, so that brake regenerative electric power obtained from the generator/motor in braking can be maximized to be used for charging the battery, further resulting in extremely improved effects on fuel economy.

The output shaft of the engine is rotated at any time, therefore, the exceeded rotation of the generator/motor which is caused when the engine is in the non-driving condition in the high-speed running condition, can be protected, and further, the battery can be charged by fully using the generating capacity of the generator/motor.

Furthermore, by changing the engine speed of the output shaft of the engine in response to the operating state of the auxiliary machinery, energy can be further efficiently used.

What is claimed is:

1. A hybrid vehicle, comprising:

an internal-combustion engine driving an engine output shaft;

a generator/motor for outputting rotational speed or torque;

a driving motor;

a power unit output shaft connected to said internal-combustion engine and said motor;

a differential gear unit including at least three gear elements which are a first gear element connected to said generator, a second gear element connected to said power unit output shaft, and a third gear element connected to said internal-combustion engine;

selection means for selecting a driving condition or a non-driving condition for said internal combustion engine; and generator control means for controlling the rotational speed or torque of said generator/motor, said generator control means controlling the rotational speed or torque of said generator/motor in order to cause the rotational speed of the engine output shaft to maintain a specified value when said selection mean selects the non-driving condition.

2. The hybrid vehicle according to claim 1, wherein said generator control means controls the rotational speed of the engine output shaft based on speed of the vehicle and a permissible rotational speed of said generator/motor when the speed of the vehicle exceeds a predetermined speed value.

3. The hybrid vehicle according to claim 1, further comprising auxiliary machinery driven by receiving rotation from the engine output shaft, the engine speed required for driving said auxiliary machinery being the specified value.

4. The hybrid vehicle according to claim 3, wherein said generator control means controls the rotational speed of said generator/motor in response to driving load of said auxiliary machinery.

5. The hybrid vehicle according to claim 3, wherein said auxiliary machinery is an oil pump.

6. The hybrid vehicle according to claim 1, wherein said generator control means causes the rotational speed of the engine output shaft to increase in response to increase in vehicle speed when the vehicle speed is higher than a predetermined value.

7. The hybrid vehicle according to claim 1, wherein said generator control means causes said generator/motor to drive as a motor when vehicle speed is lower than a predetermined value.

8. The hybrid vehicle according to claim 1, wherein said selection means selects the non-driving condition when vehicle braking is detected.

9. A hybrid vehicle, comprising:

an internal-combustion engine driving an engine output shaft;

a driving motor;

a power unit output shaft connected to said motor;

a generator/motor, for outputting a rotational speed, having a stator connected to the engine output shaft and a rotor connected to said power unit output shaft;

selection means for selecting a driving condition or a non-driving condition for said internal combustion engine; and generator control means for controlling the rotational speed of said generator/motor, said generator control means controlling the rotational speed of said generator/motor in order to cause the rotational speed of the engine output shaft to maintain a specified value when said selection means selects the non-driving condition.

10. The hybrid vehicle according to claim 9, further comprising auxiliary machinery driven by receiving rotation from the engine output shaft, the engine speed required for driving said auxiliary machinery being the specified value.

11. The hybrid vehicle according to claim 10, wherein said generator control means controls the rotational speed of said generator/motor in response to a driving load of said auxiliary machinery.

12. The hybrid vehicle according to claim 10, wherein said auxiliary machinery is an oil pump.

13. The hybrid vehicle according to claim 9, wherein said generator control means causes the rotational speed of the engine output shaft to increase in response to increase in vehicle speed when the vehicle speed is higher than a predetermined value.

14. The hybrid vehicle according to claim 9, wherein said generator control means causes said generator/motor to drive as a motor when vehicle speed is lower than a predetermined value.

15. The hybrid vehicle according to claim 9, wherein said selection means selects the non-driving condition when vehicle braking is detected.

16. The hybrid vehicle according to claim 9 wherein said generator control means controls the rotational speed of the engine output shaft based on the speed of the vehicle and a permissible rotational speed of said generator when the speed of the vehicle exceeds a predetermined speed value.

17. A hybrid vehicle, comprising:

an internal-combustion engine driving an engine output shaft;

a generator/motor for outputting rotational speed and connected to said internal-combustion engine;

a driving motor;

a power unit output shaft connected to said internal-combustion engine and said motor;

a differential gear unit including at least three gear elements which are a first gear element connected to said generator/motor, a second gear element connected to said power unit output shaft, and a third gear element connected to said internal-combustion engine; and generator control means for controlling the rotational speed of said generator/motor, said generator control means controlling the rotational speed of said generator/motor in order to cause the rotational speed of the engine output shaft to maintain a specified value when said driving motor solely drives the vehicle.

18. The hybrid vehicle according to claim 17, further comprising auxiliary machinery driven by receiving rotation from the engine output shaft, the engine speed required for driving said auxiliary machinery being the specified value.

19. The hybrid vehicle according to claim 18, wherein said generator control means controls the rotational speed of said generator/motor in response to a driving load of said auxiliary machinery.

20. The hybrid vehicle according to claim 18, wherein said auxiliary machinery is an oil pump.

21. The hybrid vehicle according to claim 17, wherein said generator control means causes the rotational speed of the engine output shaft to increase in response to increase in vehicle speed when the vehicle speed is higher than a predetermined value.

22. The hybrid vehicle according to claim 17, wherein said generator control means causes said generator/motor to drive as a motor when vehicle speed is lower than a predetermined value.

23. The hybrid vehicle according to claim 17 wherein said generator control means controls the rotational speed of the engine output shaft based on speed of the vehicle and a permissible rotational speed of said generator/motor when the speed of the vehicle exceeds a predetermined speed value.

* * * * *